United States Patent
Levi et al.

(10) Patent No.: US 9,928,237 B2
(45) Date of Patent: Mar. 27, 2018

(54) AUTOMATED CONTEXTUAL-BASED SOFTWARE LOCALIZATION

(71) Applicant: HEWLETT-PACKARD DEVELOPMENT COMPANY, L.P., Houston, TX (US)

(72) Inventors: Elad Levi, Yehud (IL); Avigad Mizrahi, Yehud (IL); Uriel Lustig, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 14/783,227

(22) PCT Filed: Apr. 11, 2013

(86) PCT No.: PCT/US2013/036183
§ 371 (c)(1),
(2) Date: Oct. 8, 2015

(87) PCT Pub. No.: WO2014/168626
PCT Pub. Date: Oct. 16, 2014

(65) Prior Publication Data
US 2016/0048506 A1 Feb. 18, 2016

(51) Int. Cl.
*G06F 17/28* (2006.01)
*G06F 9/44* (2018.01)

(52) U.S. Cl.
CPC .......... *G06F 17/289* (2013.01); *G06F 9/4448* (2013.01); *G06F 17/2836* (2013.01)

(58) Field of Classification Search
None
See application file for complete search history.

(56) References Cited

U.S. PATENT DOCUMENTS 5,664,206 A * 9/1997 Murow ................. G06F 9/4448
704/5
6,092,037 A * 7/2000 Stone ................... G06F 9/4448
704/8
(Continued)

FOREIGN PATENT DOCUMENTS

| CN | 1282914 | 2/2001 |
| CN | 101473318 | 7/2009 |

(Continued)

OTHER PUBLICATIONS

International Search Report and Written Opinion, dated Feb. 3, 2014, PCT Patent Application No. PCT/US2013/036183, 11 Pages.
(Continued)

*Primary Examiner* — Jialong He
(74) *Attorney, Agent, or Firm* — Mannava & Kang, P.C.

(57) ABSTRACT

Example embodiments relate to automated contextual-based software localization. In example embodiments, at least one stage computing device may automatically detect at least one screen state related to source code for a software product. The at least one stage computing device may automatically generate at least one reduced properties file, for a first language. Each of the reduced properties files may relate to one of the screen states. The at least one stage computing device may automatically create at least one screen shot. Each of the screen shots may relate to one of the screen states. The at least one stage computing device may automatically create at least one translation package, e.g., one for each screen state. Each translation package may include the screen shot and the reduced properties file associated with particular screen state.

15 Claims, 6 Drawing Sheets

(56) References Cited

U.S. PATENT DOCUMENTS

| | | | |
|---|---|---|---|
| 6,490,547 B1* | 12/2002 | Atkin | G06F 17/289 704/3 |
| 7,103,875 B1 | 9/2006 | Kaneko et al. | |
| 7,318,020 B1* | 1/2008 | Kim | G06F 17/289 704/2 |
| 7,392,519 B2* | 6/2008 | Nguyen | G06F 9/4448 704/10 |
| 7,437,704 B2* | 10/2008 | Dahne-Steuber | G06F 9/4448 704/9 |
| 7,447,624 B2* | 11/2008 | Fuhrmann | G06F 9/4448 704/2 |
| 7,571,092 B1 | 8/2009 | Nieh | |
| 7,636,656 B1* | 12/2009 | Nieh | G06F 17/289 704/1 |
| 7,716,641 B2 | 5/2010 | McHugh et al. | |
| 7,987,087 B2* | 7/2011 | Rich | G06F 9/4448 704/2 |
| 8,819,628 B2* | 8/2014 | Raj | G06F 9/4448 717/110 |
| 8,843,360 B1* | 9/2014 | Johnston | G06F 9/4448 704/1 |
| 2002/0107684 A1* | 8/2002 | Gao | G06F 8/51 704/4 |
| 2002/0177993 A1* | 11/2002 | Veditz | G06F 17/2205 704/8 |
| 2003/0115552 A1 | 6/2003 | Jahnke et al. | |
| 2003/0154071 A1* | 8/2003 | Shreve | G06F 17/2845 704/9 |
| 2004/0088155 A1* | 5/2004 | Kerr | G06F 17/211 704/8 |
| 2004/0122652 A1* | 6/2004 | Andrews | G06F 17/289 704/2 |
| 2005/0009538 A1* | 1/2005 | MacKay | G06F 8/60 455/456.3 |
| 2006/0080082 A1* | 4/2006 | Ravindra | G06F 17/289 704/8 |
| 2006/0173671 A1* | 8/2006 | Okawa | G06F 9/4448 704/5 |
| 2006/0287844 A1* | 12/2006 | Rich | G06F 17/289 704/2 |
| 2007/0027670 A1 | 2/2007 | Verhey-Henke et al. | |
| 2007/0208553 A1 | 9/2007 | Hastings et al. | |
| 2007/0226608 A1* | 9/2007 | Virk | G06F 9/4448 715/234 |
| 2008/0127045 A1 | 5/2008 | Pratt et al. | |
| 2009/0276206 A1 | 11/2009 | Fitzpatrick et al. | |
| 2010/0011354 A1 | 1/2010 | Gharabally et al. | |
| 2016/0048506 A1* | 2/2016 | Levi | G06F 17/289 704/3 |
| 2016/0139914 A1* | 5/2016 | Levi | G06Q 10/00 717/121 |

FOREIGN PATENT DOCUMENTS

| | | |
|---|---|---|
| EP | 1315086 A1 | 5/2003 |
| WO | WO-200038052 A1 | 6/2000 |
| WO | WO-0108006 A1 | 2/2001 |
| WO | WO-200108006 A1 | 2/2001 |

OTHER PUBLICATIONS

Unknown, Automated Localization Workflow—a Reference Model, Retrieved from the Internet: <http://www.i18n.ca/publications/AutoLocalizationModel.pdf> [retrieved on Apr. 9, 2013], 6 pages.

Extended European Search Report received in EP Application No. 13881803.4, dated Dec. 20, 2016, 9 pages.

"Amazon Mechanical Turk-Welcome", Retrieved from the Internet on Oct. 6, 2017, 1 page, <https://www.mturk.corn/mturk/welcome>.

Lingobit, "Lingobit Extractor—Extracts hard-coded strings to resources", Retrieved from Internet on Oct. 6, 2017, 2 pages, <http://www.lingobit.com/products/hardcoded_string_extraction.html>.

"What is Amazon Mechanical Turk?", 1 page, Retrieved from the Internet on Oct. 10, 2017 <https://www.rnturk.com/rnturk/help?helpPage=overview>.

Dean Hume, "Coding Tips & Tricks—Automatic Resource File Translation with the Microsoft Translator Service", Retrieved from Internet on Oct. 6, 2017, 6 pages, <http://www.deanhume.com/Home/BlogPost/automatic-resource-file-translation-with-the-miorosoft-translator-service/57>.

"DevOps-Wikipedia," retrieved from Internet on Oct. 6, 2017, 7 pages, <https://en.wikipedia.org/wiki/DevOps>.

DZone, "Automatic Resource File Translation via Google Translate-DZone," Retrieved from Internet on Oct. 6, 2017, 4 pages, <https://dzone.com/articles/automatic-resource-file>.

Microsoft Translator, "Translator API", Microsoft, retrieved from the Internet on Oct. 6, 2017, 8 pages, <https://www.microsoft.com/en-us/translator/translatorapi,aspx>.

Selenium, "Web Browser Automation", retrieved from Internet on Oct. 6, 2017, 3 pages, <http://www.seleniumhq.org/>.

Wikipedia, "Aspect-oriented programming", retrieved from Internet on Oct. 6, 2017, 9 pages, <https://en.wikipedia.org/wiki/Aspect-oriented_programming>.

* cited by examiner

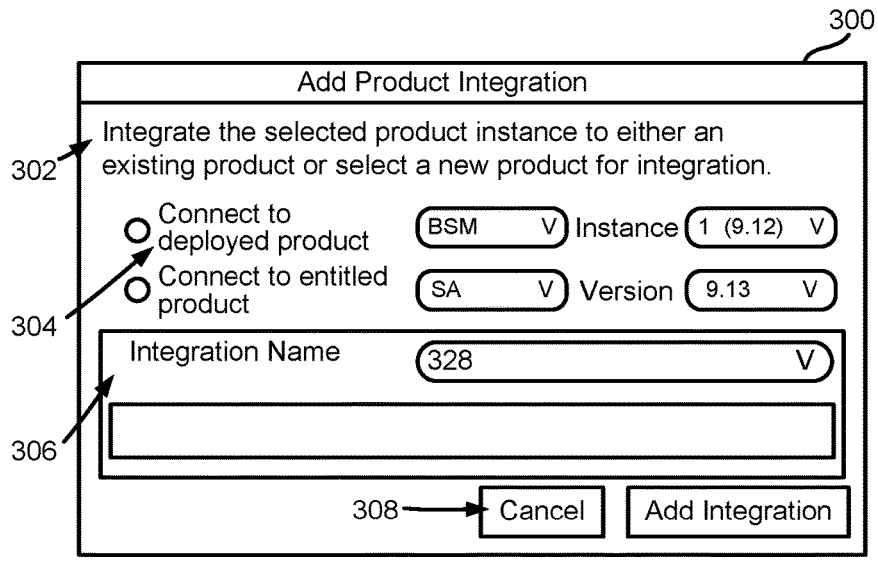

*FIG. 3A*

```
                                                      330
       #Tue  Oct 23  13:37:47  IST  2012              ⤳
338→ AddIntegrationDialogCancelButton=Cancel              FIG. 3B
       AddIntegrationDialogInstance=Instance
       AddIntegrationDialogTitle=Add Product Integration
       AddIntegrationDialogAddButton=Add Integration
332→ AddIntegrationDialogDescription=Integrate the selected product instance\
            to either an existing product or select a new product for integration.
       AddIntegrationDialogVersion=Version
336→ AddIntegrationDialogCatalogId=Integration Name
       AddIntegrationDialogConnectToNew=Connect to entitled product
       IntegrationsAddIntegrationTooltip=Add Integration
334→ AddIntegrationDialogConnectToExisting=Connect to deployed product
```

```
                                                      360
       #Tue  Oct 23  13:39:47  IST  2012              ⤳
368→ AddIntegrationDialogCancelButton=Annuler             FIG. 3C
       AddIntegrationDialogInstance=Instance
       AddIntegrationDialogTitle=Ajouter intégration de produit
       AddIntegrationDialogAddButton=Ajouter Integration
362→ AddIntegrationDialogDescription=Intégrer l'instance produit sélectionné\
         soit un produit existant our sélectionnez un nouveau produit pour l'intégration.
       AddIntegrationDialogVersion=Version
366→ AddIntegrationDialogCatalogId=Nom de l'intégration
       AddIntegrationDialogConnectToNew=Se connecter au produit
       IntegrationsAddIntegrationTooltip=Ajouter Integration
364→ AddIntegrationDialogConnectToExisting=Se connecter au déploiement du produit
```

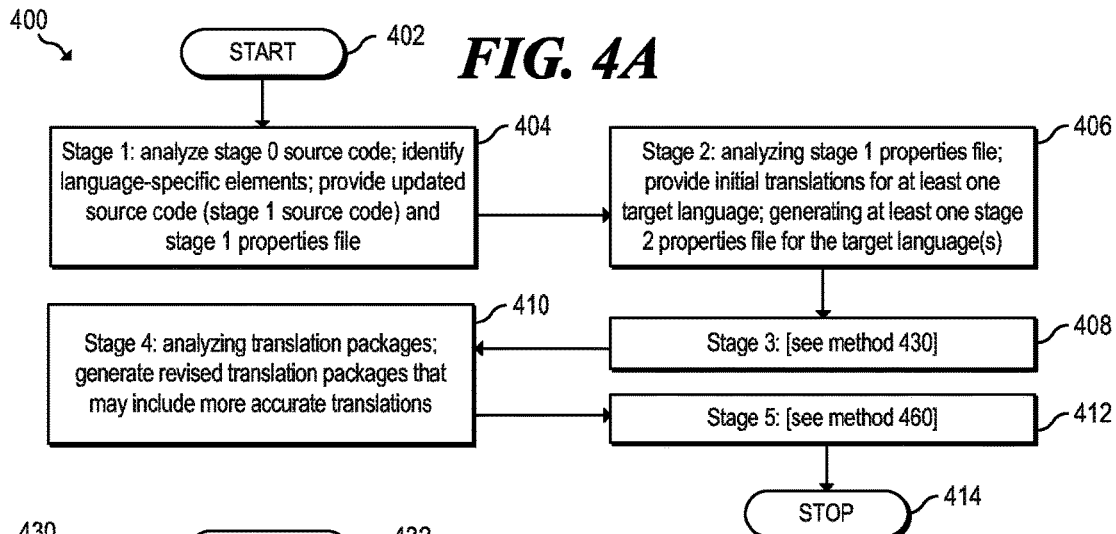
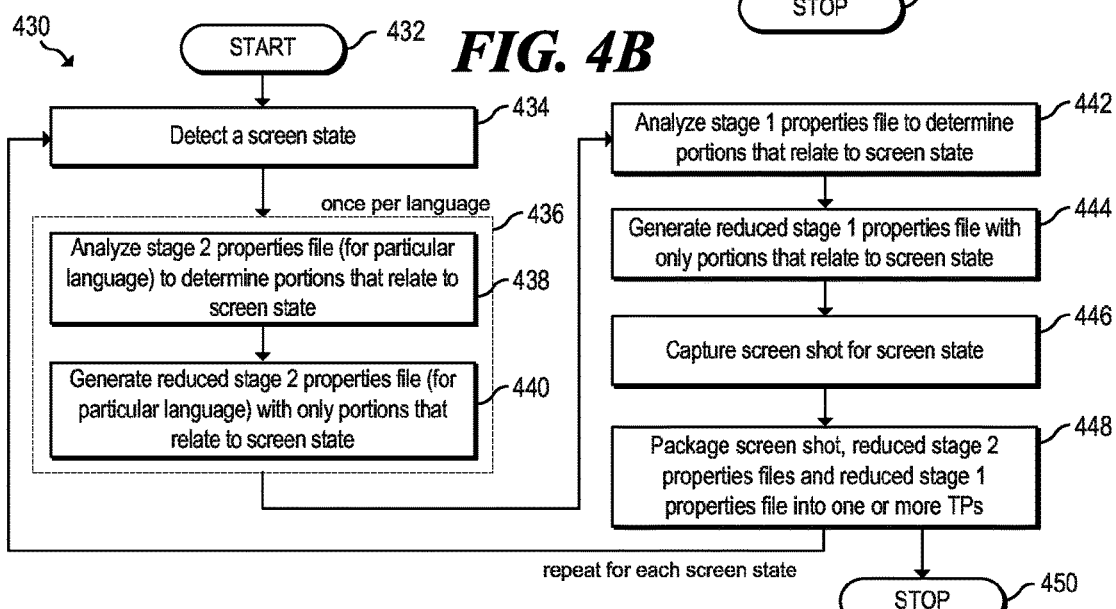
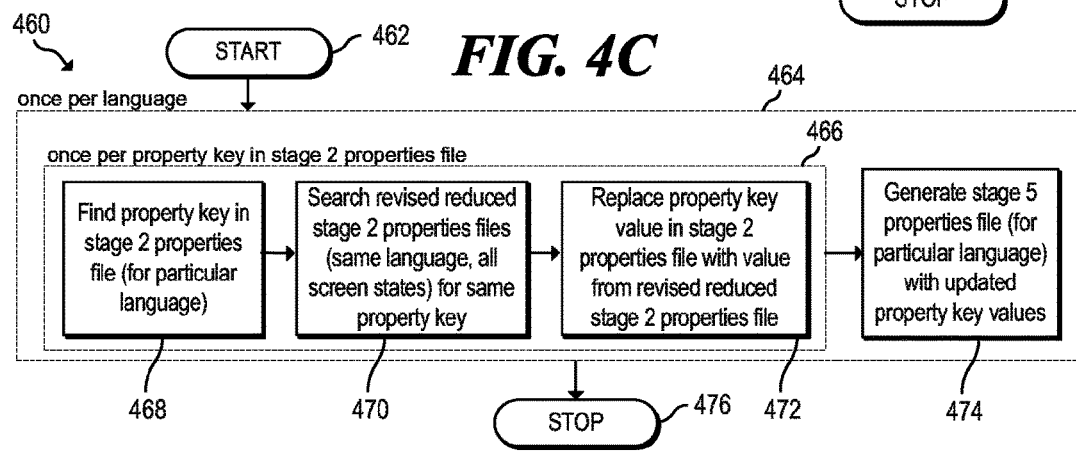

AUTOMATED CONTEXTUAL-BASED SOFTWARE LOCALIZATION

CROSS-REFERENCE TO RELATED APPLICATION

This application is a U.S. National Stage Application of and claims priority to International Patent Application No. PCT/US2013/036183, filed on Apr. 11, 2013, and entitled "AUTOMATED CONTEXTUAL-BASED SOFTWARE LOCALIZATION".

BACKGROUND

In some scenarios, software products (e.g., applications, operating systems, etc.) may need to be provided in multiple different human languages. In some scenarios, a software product may be originally provided in a first language (e.g., a source language), and may need to be converted to at least one other language (e.g., target languages). For example, this conversion may be performed by identifying language-specific elements (e.g., displayable string elements within the user interface) of a software product and translating the string elements from the source language to the target language. Once all the language-specific elements have been translated the product may be re-compiled to produce a language-specific version of the software product for the target language. The process of converting a software product from one language to another language may be generally referred to as "localization." In some scenarios, a software product may be designed such that it can be adapted to various languages more easily, for example, by providing placeholders that may later be substituted with language-specific elements. In this scenario, the process of adapting such a software product may also be referred to as "localization."

BRIEF DESCRIPTION OF THE DRAWINGS

The following detailed description references the drawings, wherein:

FIG. 3A depicts an example screen shot that may be included in an example translation package for automated contextual-based software localization;

FIG. 3B depicts at least part of an example reduced stage 1 properties file that may be included in an example translation package for automated contextual-based software localization;

FIG. 3C depicts at least part of an example reduced stage 1 properties file that may be included in an example translation package for automated contextual-based software localization;

FIG. 4A is a flowchart of an example method for automated contextual-based software localization;

FIG. 4B is a flowchart of an example method for automated contextual-based software localization;

FIG. 4C is a flowchart of an example method for automated contextual-based software localization;

DETAILED DESCRIPTION

Figure 1A:
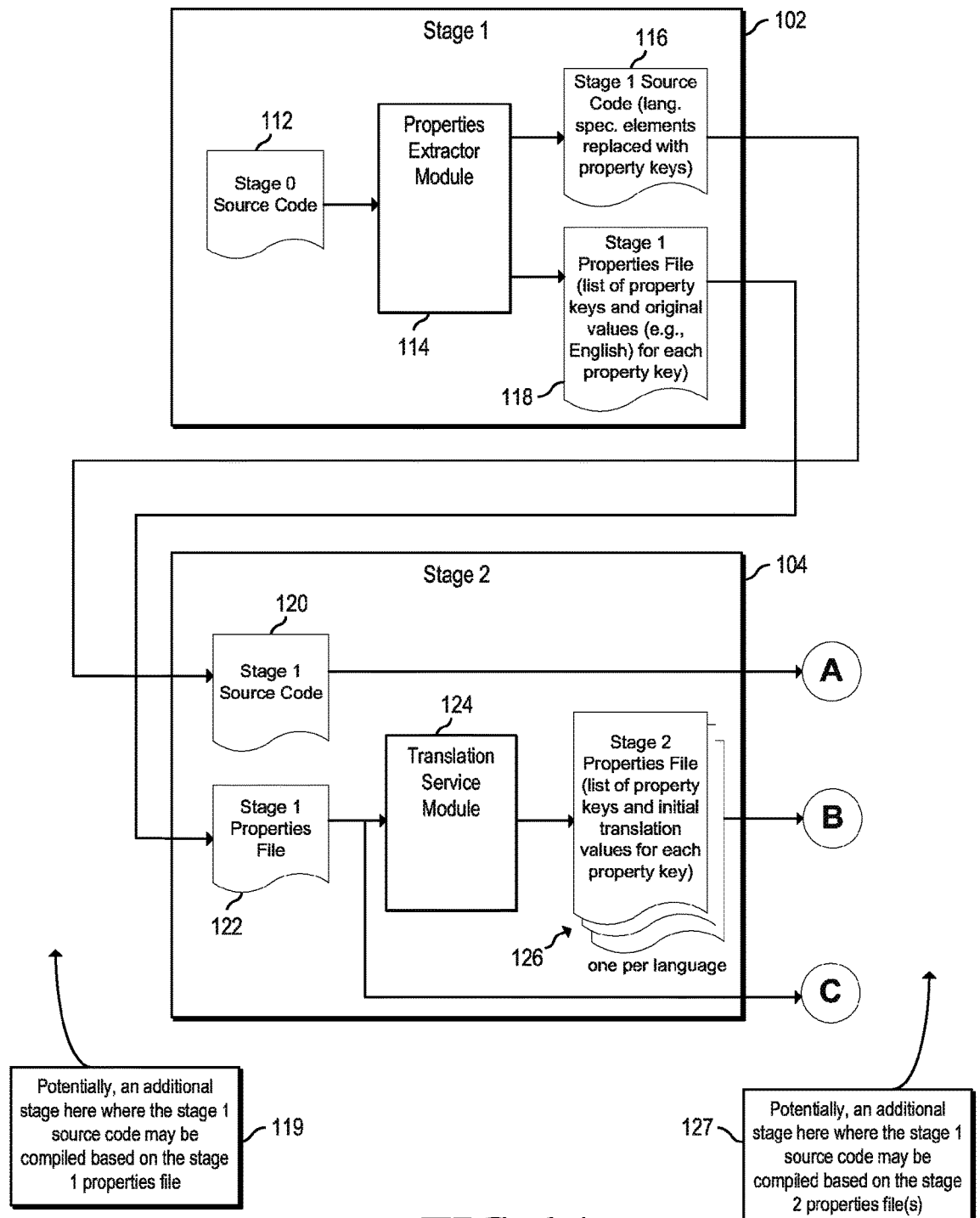
FIG. 1A depicts block diagrams of stages and flows of information in an example software development process that utilizes automated contextual-based software localization.

As described above, the localization process my include converting a software product from a first language (e.g., a source language) to at least one other language (e.g., target languages), or converting a software product designed with placeholders to at least one language. In some scenarios, the localization process may be used to convert a software product to accommodate not just different languages, but also different regions (e.g., slight regional preferences), different markets (e.g., different technical requirements) or other finer adjustments.

The localization process may be very time consuming and costly. The source code of the software product may need to be prepared, for example, by identifying and extracting all language-specific elements (e.g., displayable string elements within the user interface). Code analysis tools may be used, to some extent, to identify language specific elements, but developers are often not aware of these tools or forget about them. Then, when a list of extracted language-specific elements has been assembled, the language-specific elements need to be translated. While some automatic translation programs or services may be available, such services, in many scenarios, are not sophisticated enough to provide a high-quality translation. Typically, the translation of strings is performed by a human translator who is provided with a file or table of extracted strings that require translation. The human translator will then translate the strings and return the translations to the developer, who may insert the translations into the software product. Before inserting the translations into the software product, a linguistic reviewer (e.g., a natural speaker of the target language) may review the file or table of translated strings. Additional review of the translations may be performed once the translations are inserted and the software product is re-compiled and run. Such reviews are labor intensive and can be extremely expensive. Additionally, such reviews may take a long time, which may result in a slow delivery of localized versions of software products.

Linguistic errors are a major problem for localized software. Linguistic errors may refer to errors in the translation of the software product that are easily detected by native users of the software product. These errors may reflect poorly on the overall quality of the software product, and may even cause the software product to malfunction (e.g., crash). Fixing linguistic errors, especially at a later stage of the software product development, may require significant time and money (e.g., for translators and engineers to design and test fixes). One major cause of linguistic errors is that the human translation, and perhaps at least one round of review, are performed in isolation, e.g., without the precise context of how the strings are used in the software product. For example, in some languages, a correct translation of a word or phrase for use on a button may be different from the correct translation for use in a title or in a text box. It may be very difficult if not impossible for a translator or reviewer to provide accurate translations when the strings are lacking context. Even if the translator or reviewer is familiar with the software product, it may be hard to picture the specific location and context of a string with the software product user interface.

The present disclosure describes automated contextual-based software localization. The present disclosure describes providing (e.g., to a human translator) language-specific elements that may need to be localized along with contextual information (e.g., screen shots) of how the elements are used in the software product user interface. The present disclosure describes automatically detecting multiple screen states in source code related to a software product, and automatically generating, for each of the multiple screen states, a screen shot and at least one reduced properties file that includes language specific elements displayable in such a screen shot. The present disclosure describes automatically creating, for each of the multiple screen states, a translation package that includes the screen shot and at least one reduced properties file associated with the particular screen state. The present disclosure may utilize automatic routines to extract language-specific elements from the source code. It should be understood that the techniques of the present disclosure may be used for source code that has been programmed for a particular source language and/or source code that has been programmed with placeholders for language-specific elements.

The present disclosure may provide benefits over previous localization routines. For example, human translations may be more accurate and may take less time because a translator may be able to refer to contextual information during the translation process. Human translators may need to ask far less or no clarifying questions (e.g., questions regarding whether a particular translation is correct) to an R&D team, which may save large amounts of time (e.g., one week per round of clarifying questions). Human translators may make far fewer linguistic errors during the translation process which may result in a more polished and more functionally correct software product. Additionally, because of the streamlining of human translation in the software development process, the software development process may be much more scalable.

Figure 1B:
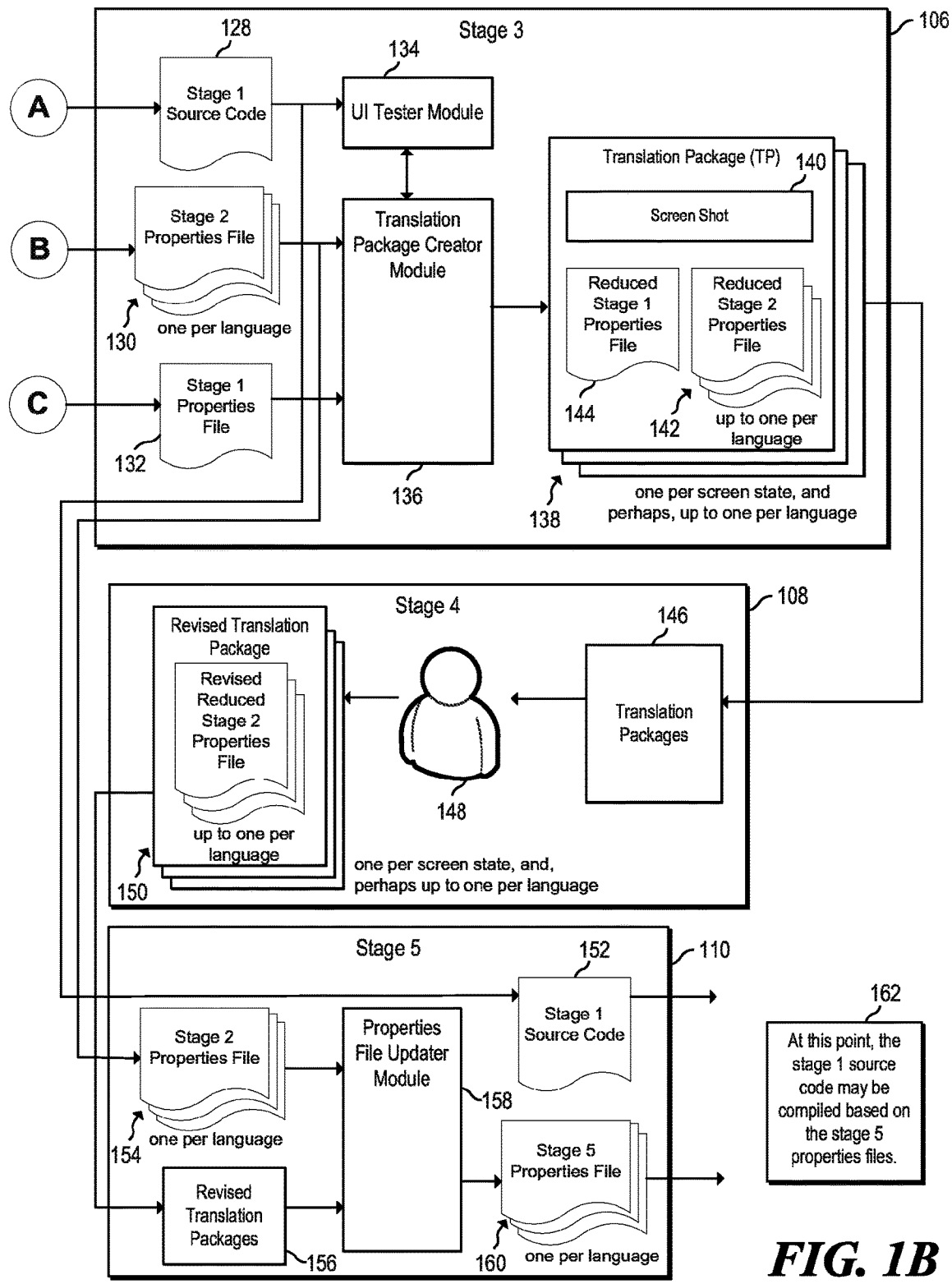
FIG. 1B depicts block diagrams of stages and flows of information in an example software development process that utilizes automated contextual-based software localization.

FIGS. 1A and 1B depict block diagrams of stages and flows of information in an example software development process that utilizes automated contextual-based software localization. For example, stages 102, 104, 106, 108 and 110 may be included in an example software development process, according to at least one embodiment of the present disclosure. Such a software development process may include more or less stages than are shown in FIGS. 1A and 1B. For example, the software development process may include additional stages for programming of the software, compiling the software, releasing the software, functionally testing the software (e.g., for bugs, performance, etc.) and the like. Any of these additional stages may be inserted between any of the stages depicted in FIGS. 1A and 1B and any of the stages depicted in FIGS. 1A and 1B may be inserted between, any stages in an existing software development process. In this respect, the stages depicted in FIGS. 1A and 1B may be integrated with any existing software development process (e.g., an Agile development process).

The term "software development process" (also referred to as "software development lifecycle" or "end-to-end (E2E) software development") as used herein may refer to any process for developing software that conforms to a structure, model or standard. Such a standard may define stages and tasks that may be required to develop, test and maintain a software product. Agile is one example standard that defines an iterative development process that relies on regular releases, regular testing and feedback. The term "stage" as used herein may be used to refer to a part of a software development process, for example, where at least one routine may be performed to progress the development of the software product. A stage may be carried out or executed on a computing device (e.g., referred to as a "stage computing device"). A stage computing device may execute a stage either automatically or with user input. Throughout this disclosure, it should be understood that the term "stage" may be used in a flexible manner to refer to a stage of a software development process in the abstract or to a stage computing device used to perform the routines of a stage.

Each of stages 102, 104, 106, 108 and 110 may be performed by at least one computing device (e.g., referred to as a stage computing device), which may be, for example, any computing device capable of communicating (e.g., over a network) with at least one other computing device. In some embodiments, each stage may be implemented in a different computing device. In other embodiments, two or more of the stages shown in FIGS. 1A and 1B may be implemented in the same computing device. In other embodiments, at least one stage may be implemented by more than one computing device. The term "system" may be used to refer to either a single computing device or multiple computing devices, for example, where each computing device in the system is in communication with at least one other of the multiple computing devices in the system. More details regarding example computing devices that may be used for at least one of these stages may be described below, for example, with regard to stage computing device 500 of FIG. 5.

As a starting point to discussing stages 102, 104, 106, 108 and 110, source code for a software product may be available. The source code and perhaps other files may be used to build an executable version of the software product. The term "code base" may be used to refer to all the human-written files (e.g., as opposed to tool-generated files), including the source code, that are required to perform such as software build. Files in the code base other than the source code may include configuration files, properties files, resource files and the like. The source code or code base may be provided by a different stage (e.g., not shown in FIG. 1A or 1B) of the software development process or as input by a user.

Stage 1 (indicated by reference number 102) may include analyzing the source code of a software product to identify language-specific elements and providing updated source code and at least one properties file. A stage computing device that implements stage 1 may receive (e.g., from an external computing device, user input or internal storage) stage 0 source code 112. Stage 0 source code 112 may refer to the source code as it exists in whatever state it was in before stage 1. As one example, stage 0 source code 112 may have been programmed and functionally tested to at least some degree. A stage 1 computing device may include a properties extractor module 114 that may analyze stage 0 source code 112 and provide stage 1 source code 116 and a stage 1 properties file 118.

Properties extractor module 114 may analyze stage 0 source code 112 to identify language-specific elements. A language-specific element may refer to any text in the source code that may affect the way (e.g., in a language or location-specific manner) the related software product may display to a user (e.g., via a user interface). These language-specific elements may be the items that need to be "localized" in order to convert the software product to a different language. For example, strings in the source code that may be displayed to a user as part of a user interface (e.g., window, button, menu, toolbar, etc.) may be language specific elements. Other examples of language-specific elements include hotkeys, coordinate sizes or any other elements that may affect the way the software product is displayed depending on the target language or region. Properties extractor module 114 may detect code in the source code that indicates that a text string will be displayed to a user. Properties extractor module 114 may ignore programming comments, module names and the like, for example, because the precise text of these elements may not be displayed to a user. In some scenarios, properties extractor 114 may detect placeholders that were previously inserted into the source code with the intention of later being substituted with language-specific elements. Properties extractor may allow a user (e.g., a member of a software build team) to search (e.g., at least partially manually) for language-specific elements or it may perform the detection automatically.

Properties extractor module 114 may replace language-specific elements or placeholders in the source code with new placeholders, referred to herein as "property keys." A property key may be a name or a text pattern that is unique to the language-specific element or placeholder that the property key replaces. A property key may be similar to a constant used in programming, where the constant name may be inserted into the code and may take on particular designated value when the code is compiled. As explained below, later on, at least one language-specific value (e.g., translated value) may be associated with each property key. Properties extractor module 114 may step through stage 0 source code 112, and each time a language-specific element (e.g., a displayable string or a placeholder) is detected, properties extractor module 114 may generate a unique property key and replace the language-specific element with the property key. Properties extractor module may output stage 1 source code 116, which may be the same as stage 0 source code but with language-specific elements replaced with property keys.

Properties extractor module 114 may generate a properties file, for example, stage 1 properties file 118. Stage 1 properties file 118 may include a list of all the property keys generated by the properties extractor module 114 while it stepped through stage 0 source code 112. In some embodiments, properties extractor module 114 may generate more than one properties file, for example, where each properties file includes a subset of all the property keys generated. In fact, in various embodiments, any one of the properties files discussed herein may be implemented as more than one properties file. However, for simplicity, the present disclosure may refer to various single properties files. Stage 1 properties file 118 may also include a value for each property key. The property key values may be used, later on, when the source code is compiled, in which case, the values may replace the property keys in the source code. For the purposes of stage 1, the property key values may be initialized with the original values of the language-specific elements. For example, if a string was replaced with a property key, then the value associated with that property key in the properties file may be the string. As one specific example, if an original version of the software product was provided in English, then stage 1 properties file 118 may include property key values that are in English. As another example, if an original placeholder was replaced with a property key, then the value associated with that property key in the properties file may be the original placeholder or the value may be empty.

Stage 1 may output stage 1 source code 116 and stage 1 properties file 118, and at least one later stage of the software development process may use these. For example, a stage 1 computing device may communicate stage 1 source code 116 and stage 1 properties the 118 to a stage 2 computing device. In some embodiments, a stage 1 computing device may automatically communicate stage 1 source code 116 and stage 1 properties file 118 to a subsequent stage (e.g., stage 2) as soon as the properties extractor 114 has generated the stage 1 source code 116 and/or stage 1 properties file 118. In some scenarios, the stage 1 computing device may communicate these items to at least one other stage, and then the at least one other stage may communicate these items to stage 2. In some scenarios, the stage 1 computing device may communicate these items to a stage that is later in the process than stage 2, for example, stage 3. In this respect, stage 2 may be skipped or excluded. In some scenarios, the software development process may include an additional stage (indicated by reference number 119) where the stage 1 source code 120 may be compiled based on the stage 2 properties file(s) 126.

Stage 2 (indicated by reference number 104) may include analyzing the stage 1 properties file, providing initial translations for at least one target language and generating at least one target language properties file. A stage computing device that implements stage 2 may receive (e.g., from a stage 1 computing device or from internal storage) stage 1 source code 120 and stage 1 properties file 122. Stage 1 source code 120 may be the same as or a copy of stage 1 source code 116, and stage 1 properties file 122 may be the same as or a copy of stage 1 properties file 118. Stage 2 may pass stage 1 source code 120 on to later stages, for example, without modification. A stage 2 computing device may include a translation service module 124 that may analyze stage 1 properties file 122 and provide at least one stage 2 properties file 126.

Translation service module 124 may analyze stage 1 properties file 122. Translation service module 124 may step through properties file 122, and for each property key, translation service module 124 may translate the associated property key value from the source language to at least one target language. Translation service module 124 may include or access a service that is capable of performing automatic translation of words and/or phrases. For example, translation service module 124 may include or have access to a translation repository. Additionally, translation service module 124 may include or have access to a translation provider (e.g., an online translation provider accessible via an API). As described above, while some automatic translation programs or services may be available, such services, in many scenarios, are not sophisticated enough to provide a high-quality translation. Therefore, stage 2 may be thought of as providing a "first draft" of translations for the stage 1 properties file. As indicated above, in some embodiments or scenarios, stage 2 may be skipped or excluded. In these situations, a first draft translation may not be provided for the properties file (e.g., stage 1 properties file 118) before stage 3. In these situations, a localized version of the software may not be available until later stages (e.g., stage 5).

Translation service module 124 may generate one stage 2 properties file 126 for each target language (e.g., for each language for which the original software product will be provided and/or supported). In this respect, the present disclosure may support localization to multiple target languages (i.e., "supported languages") simultaneously. Each stage 2 properties file 126 may include a list of all the property keys generated by the properties extractor module 114. Each stage 2 properties file 126 may also include a value for each property key. For the purposes of stage 2, the property key values may differ between the stage 2 properties files, depending on the target language. For example, if an original version of the software product was provided in English, then stage 1 properties file 122 may include property key values that are in English. Then, a first stage 2 properties file 126 may include property key values that are in French, and a second stage 2 properties the 126 may include property key values that are in German, and so on.

Stage 2 may output stage 1 source code 120 (e.g., passed to FIG. 1B via circle "A"), stage 2 properties file(s) 126 (e.g., passed to FIG. 1B via circle "B") and stage 1 properties file 122 (e.g., passed to FIG. 1B via circle "C"), and a later stage may use these. For example, a stage 2 computing device may communicate these items to a stage 3 computing device. In some scenarios, the stage 2 computing device may communicate these items to at least one other stage, and then the at least one other stage may communicate these items to stage 3. In some scenarios, the stage 2 computing device may communicate these items to a stage that is later in the process than stage 3. In some scenarios, the software development process may include an additional stage (indicated by reference number 127) where the stage 1 source code 120 may be compiled based on the stage 2 properties file(s) 126.

Stage 3 (indicated by reference number 106) may include analyzing the source code and properties files to generate a translation package (TP) for each screen state (and perhaps up to one per language) of the software product. The term "screen state" may refer to a discrete part of a user interface (UI) of a software product that may be displayed to a user. A screen state may refer to the windows or layers that are displayed to a user, as opposed to the entirety of the screen that is presented to a user at any particular time. For example, if a main window were presented to a user, this may be a first screen state. Then, if a user clicked on a button and a smaller dialogue window popped up inside the main window, the smaller dialogue window may itself be a second screen state. In some embodiments, the UI information of a software product may be divided into screen states in a way such that no instances of language-based elements are duplicated between screen states. Thus, in the example from above, even while the smaller dialogue window is displaying, the first screen state would not include the same instances of language-based elements as the smaller dialogue window, and the second screen state would not include the same instances of language-based elements as the larger main window behind the dialogue window. In this respect, each instance of a language-based element that is presented to a user throughout the usage of a software product may be uniquely associated with a particular screen state.

A stage computing device that implements stage 3 may receive (e.g., from a stage 2 computing device or from internal storage) stage 1 source code 128 (e.g., passed from FIG. 1A via circle "A"), stage 2 properties file(s) 130 (e.g., passed from FIG. 1A via circle "B") and stage 1 properties file 132 (e.g., passed from FIG. 1A via circle "C"). Stage 1 source code 128 may be the same as or a copy of stage 1 source code 120. Stage 2 properties file(s) 130 may be the same as or a copy of stage 2 properties file(s) 126, and stage 1 properties file 132 may be the same as or a copy of stage 1 properties file 122. A stage 3 computing device may include a UI tester module 134 and a translation package creator module 136. Each of these modules may include a series of instructions encoded on a machine-readable storage medium and executable by a processor of a stage computing device. In addition or as an alternative, each module may include one or more hardware devices including electronic circuitry for implementing the functionality described below. With respect to the modules described and shown herein, it should be understood that part or all of the executable instructions and/or electronic circuitry included within one module may, in alternate embodiments, be included in a different module shown in the figures or in a different module not shown.

UI tester module 134 may analyze and/or test the user interface (also referred to as the "graphical user interface" or GUI) components of stage 1 source code 128, for example, to test whether these components appear to function correctly with other parts of stage 1 source code 128. UI tester module 124 may scan or walk through the source code and identify code that may cause a UI component (e.g., a window, menu, etc.) to display to a user. An individual UI component may be considered a screen state. UI tester module 124 may simulate user interaction with the UI. For example, LA tester module 124 may simulate a user navigating through the graphical features of an application (e.g., clicking buttons, etc.). UI tester module 124 may ensure that every UI component (e.g., titles, navigation bars, buttons, etc.) that may display to a user is analyzed. UI tester 124 may analyze and/or test the UI components of both device-based software products and web-based applications. UI tester module 124 may adapt to various code organization paradigms, for example, AOP (aspect oriented programming). In this respect, because translation package creator module 136 may interface with UI tester module 134, the localization techniques described herein may be used with any code organization paradigm.

Translation package creator module 136 may interface with UI tester module 134. In alternate embodiments, translation package creator module 136 may be integrated with UI tester module 134. Translation package creator 136 may use information from UI tester module 134 and stage 2 properties file(s) 130 to generate reduced properties files for each language and for each screen state (e.g., one for a main window, one for a smaller dialogue window, etc.). Each reduced properties file, for a particular language, may include only the language-specific elements (e.g., strings) that are presented to the user by the particular screen state. Thus, translation package creator 136 may use in formation from UI tester module 134 to determine which portions (e.g., property keys and values) of a stage 2 properties files 130 and/or stage 1 properties file are associated with each screen state. Translation package creator may also use information from UI tester module 134 to capture, receive and/or create a screen shot for each screen state.

Figure 2:
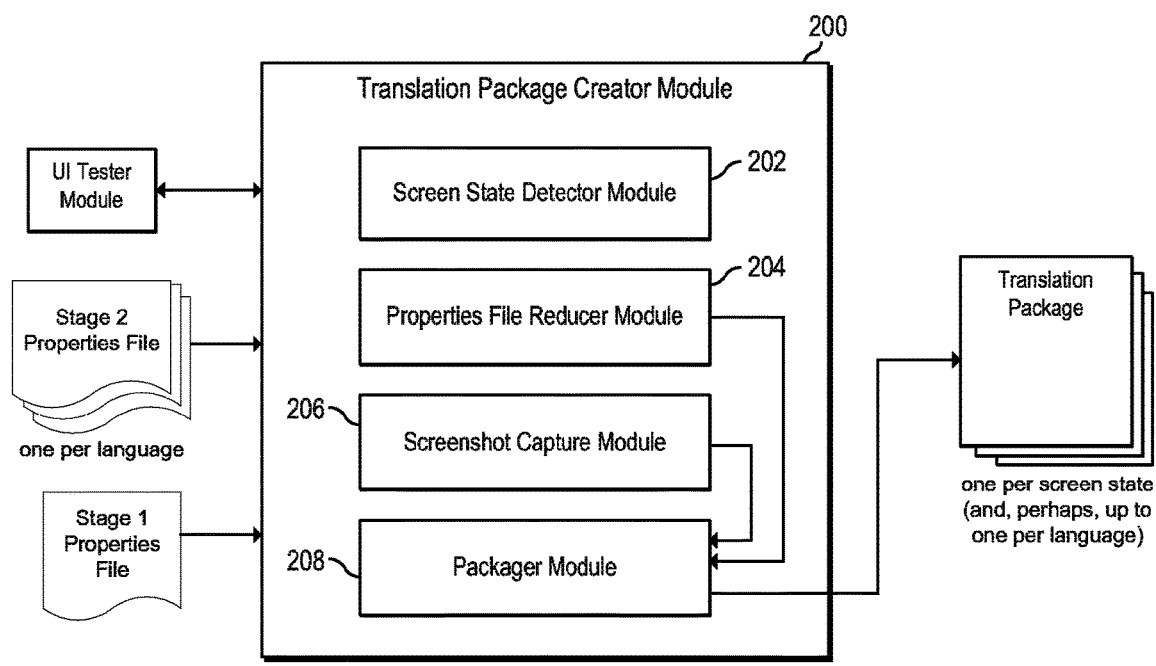
FIG. 2 is a block diagram of an example translation package creator module for automated contextual-based software localization.

FIG. 2 is a block diagram of an example translation package creator module 200, which may be similar to translation package creator module 136 of FIG. 1B, for example. Translation package creator module 200 may cooperate with a UI tester module (e.g., module 134) to automatically step through all the UI components of the source code to generate reduced properties files and a screen shot (e.g., used for software product context), for each screen state. Translation package creator module 200 may include a number of modules 202, 204, 206, 208. Each of these modules may include a series of instructions encoded on a machine-readable storage medium and executable by a processor of a stage computing device. In addition or as an alternative, each module may include one or more hardware devices including electronic circuitry for implementing the functionality described below. With respect to the modules described and shown herein, it should be understood that part or all of the executable instructions and/or electronic circuitry included within one module may, in alternate embodiments, be included in a different module shown in the figures or in a different module not shown.

Screen stage detector module 202 may detect screen states in the source code (e.g., stage 1 source code 128). Screen stage detector module 202 may interface with a UI tester module (e.g., UI tester module 134) to detect screen states in the source code. Once a screen state is detected, translation package creator module 200 may (e.g., via module 202 and/or module 204) determine which portions of at least one properties file are associated with the screen state. For example, screen state detector module 202 may analyze the code associated with a particular screen state to determine which property keys are included in such code.

Properties file reducer module 204 may generate at least one reduced properties file based on at least one properties file and information about the screen state(s). For example, when the screen state detector module detects a screen state and the property keys associated with the screen state, properties file reducer module 204 may analyze each stage 2 properties file (e.g., one per language) to identify the same property keys (associated with the screen state). The portions of these properties files that are associated with the screen state may then be extracted and used to generate new properties files. The process may then be repeated for other screen states. The result may be, for each language-specific stage 2 properties file, one reduced properties file per screen state, where each reduced properties file includes property keys and values associated with the particular screen state. Properties file reducer module 204 may also generate a reduced properties file for the stage 1 properties file, in a similar manner.

Screen shot capture module 206 may capture, receive, generate and/or create at least one screen shot based on information about the screen state. For example, when the screen state detector module detects a screen state, screen shot capture module 206 may capture, receive, generate and/or create an image (e.g., a GIF, JPG, PNG or the like) that is identical or similar to the image that a user sees when encountering the screen state while using the software product.

Packager module 208 may package, for each screen state, and perhaps up to one per language, the associated screen shot and at least one associated reduced properties file. Packager module 208 may receive (e.g., from module 206) a screen shot for each screen state. Packager module 208 may receive (e.g., from module 204) at least one reduced stage 2 properties file for each screen state. Packager module 208 may receive (e.g., from module 204) a reduced stage 1 properties file for each screen state. Packager module 208 may create a translation package (TP) for each screen state, and perhaps up to one language, as explained in more detail below.

Referring again to FIG. 1B, translation package creator module 136 may create at least one translation package (TP) 138, for example, one translation package per screen state, and perhaps, up to one per language. In various scenarios, translation packages may be constructed in various ways. In the specific embodiment of FIG. 1B, translation packages 138 may be constructed one per screen state, where each translation package 138 includes a screen shot 140, one reduced stage 2 properties file 142 for each supported language, and perhaps a reduced stage 1 properties file 144. In other scenarios, translation packages 138 may be constructed one per screen state, and then for each screen state, up to one translation package per supported language. In other words, in the scenario with one TP per supported language, the total number of translation packages may be [the number of screen states] times [the number of supported languages]. In this scenario, each translation package 138 (for a particular screen state and supported language) includes a screen shot 140, one reduced stage 2 properties file 142 for the particular supported language, and perhaps a reduced stage 1 properties file 144. In this scenario, for a particular screen shot, the translation packages (one per supported language) may include duplicate information. For example, each translation package (for a screen state) may include a copy of the associated screen shot and, perhaps, a copy of the associated reduced stage 1 properties file. Just to be clear, in this scenario, translation packages 138 of FIG. 1B may appear with one screen shot, one reduced stage 1 properties file and one reduced stage 2 properties file, and then, the translation packages may be one per screen state and one per supported language. In other scenarios, some translation packages (per screen state) may include more or less reduced stage 2 properties files than other TPs. For example, one TP may support 3 languages and another TP may support 1 language.

Screen shot 140 may be an image (e.g., a GIF, JPG, PNG or the like) that shows a part of the UI that is displayed to the user in conjunction with the related screen state. Each reduced stage 2 properties file 142 may be a subset of the stage 2 properties file 130 for the corresponding language. Each reduced stage 2 properties file 142 may include only the portions of the state 2 properties file that are associated with the related screen state. For example, a stage 2 properties file may include only property keys and values that are associated with language-specific elements that may display as a result of the related screen state. Likewise, reduced stage 1 properties file 144 may be a subset of the stage 1 properties file 132 and may include only property keys and values from the stage 1 properties file 132 that are associated with language-specific elements that may display as a result of the related screen state.

Translation package creator module 136 may then package together screen shot 140, the at least one reduced stage 2 properties file 142 (e.g., one for each supported language), and perhaps a reduced stage 1 properties file 144. As explained above, in alternate embodiments, translation package creator module 136 may package one TP per screen state or one TP per screen state and up to one per supported language. Translation package 138 may take the form of any file or folder that may contain multiple files (e.g., a .zip file, a .rar file, a digital folder or the like). At this point, each TP may provide various elements that need to be localized (e.g., the property keys and values from the reduced stage 1 properties file 144), a first draft of translations for the elements (e.g., the values in the reduced stage 2 properties file(s), as well as application-specific contextual information for each element (the screen shot).

FIGS. 3A to 3O depict example contents of an example translation package. FIG. 3A depicts an example screen shot 300 that may be included in an example translation package. FIG. 3B depicts at least part of an example reduced stage 1 properties file 330 (e.g., in English) that may be included in an example translation package. FIG. 3C depicts at least part of an example reduced stage 2 properties file 360 (e.g., in French) that may be included in an example translation package. As can be seen by comparing FIGS. 3A, 3B and 3O, various language-specific elements of the UI (i.e., screen shot 300) have property key (and value) counterparts in the properties files. For example, language-specific elements (e.g., displayable strings) 302, 304, 306 and 308 in FIG. 3A have counterpart property keys/values 332, 334, 336 and 338 in FIG. 3B. Likewise, for example, language-specific elements (e.g., displayable strings) 302, 304, 306 and 308 in FIG. 3A have counterpart property keys/values 362, 364, 366 and 368 in FIG. 3O. As can be seen by comparing FIGS. 3B and 3C, the property keys (e.g., "AddIntegrationDialog-CancelButton") are the same in each properties file, but the property key values are different depending on the language (e.g., "Cancel" for English and "Annular" for French).

FIGS. 3A to 3O show an example of how a translation package may provide context for various language-specific elements that need to be translated or localized. A translation package may provide a direct link between screens that are displayable in a software product and related language-specific elements displayed in such screens. A human translator, for example, may view the English properties file (e.g., FIG. 3B) to determine the values that need to be translated. The human translator may then view the "first draft" properties file for a particular language (e.g., French in FIG. 3C) to see a potentially correct translation for the values. The human translator may then view the screen shot (e.g., FIG. 3A) to gain context for how the values are used in the software product when displayed to a user. The human translator may then confirm that the first draft translation is correct, or may modify the translation to better fit the context.

Referring again to FIG. 1B, Stage 3 may output one translation package (TP) per screen state, and perhaps up to one per language, and a later stage may use these. For example, a stage 3 computing device may communicate these items to at least one stage 4 computing device. In some scenarios, the stage 3 computing device may communicate these items to at least one other stage computing device, and then the at least one other stage computing device may communicate these items to at least one stage 4 computing device. In some scenarios, the stage 3 computing device may communicate these items to at least one stage computing device that is at a later stage in the process than stage 4. In some embodiments, a stage 3 computing device may automatically communicate translation packages 138 to a subsequent stage (e.g., stage 4) as soon as the translation package module 136 has generated the translation packages 138. Stage 3 may also output stage 1 source code 128 and/or stage 2 properties file(s) 130, and a later stage may use these. For example, a stage 3 computing device may communicate these items to a stage 5 computing device. In some scenarios, the stage 3 computing device may communicate these items to at least one other stage, and then the at least one other stage may communicate these items to stage 5. In some scenarios, the stage 3 computing device may communicate these items to a stage that is later in the process than stage 5.

Stage 4 (indicated by reference number 108) may include analyzing the translation packages to generate revised translation packages that may include more accurate translations than the "first draft" translations that may be included in translation packages from earlier stages. Stage 4 may include analysis and input by at least one human reviewer or translator (e.g., 148). Stage 4 may be implemented by more than one computing device, for example, up to one computing device per supported language. In this scenario, each computing device may receive input from a human translator of a different language. Stage 4 may receive (e.g., from a stage 3 computing device) translation packages 146. Translation packages 146 may be the same as or a copy of at least some of translation packages 138. As explained above, each translation package may include one reduced stage 2 properties file (e.g., for a particular screen state and a particular language), or may include more than one reduced stage 2 properties file. For example, if a human translator of a particular stage 4 computing device can only translate to one target language, the translation packages may only include stage 2 properties files for that language. As another example, if a human translator can translate to all the supported language, the translation packages may include stage 2 properties files for all the supported languages. As explained above, translation packages may be automatically sent by a previous stage (e.g., stage 3). As a result, a human reviewer may receive an email notification or some other notification (e.g., generated and/or communicated by an earlier stage) that a translation package is ready to review or translate.

Human translator 148 may review translation packages 146. As explained above, the review and translation process for the human reviewer may be much easier because the translation packages include screen shots (to add contextual information) associated with reduced properties files, as well as first drafts of translations. Because the translation process has been made much easier, stage 4 may be implemented, for example, by online freelance translators (e.g., Amazon's Mechanical Turk or the like). Additionally, the translation times may be reduced which means later stages (e.g., stage 5) may begin sooner. Human translator 148 may create revised translation packages 150, for example, one per screen state (e.g., for the same screen states as in translation packages 146).

Each revised translation package 150 may include at least one revised reduced stage 2 properties files. For example, if the translation packages 146 each included multiple stage 2 properties files for different languages, then each revised translation package 150 may include multiple revised reduced stage 2 properties files. On the other hand, if the translation packages 146 each included a single stage 2 properties file (e.g., for a single target language), then each revised translation package 150 may include a single revised reduced stage 2 properties files. Each revised reduced stage 2 properties file 150 may be the same as a corresponding reduced stage 2 properties file in translation packages 146, but human translator 148 may have changed some of the property key values, for example, to provide a more accurate translation. Once the revised translation packages 150 are created, they may be communicated or submitted to a later stage (e.g., stage 5) to be committed to the source code base. For example, a stage 4 computing device may include an interface by which human translator may indicate and submit revised translation packages, and then the revised translation packages may be automatically communicated to later stages (e.g., stage 5).

Thus, stage 4 may output one revised translation package per screen state, and perhaps, up to one per language, and a later stage may use these. For example, a stage 4 computing device may communicate these items to a stage 5 computing device. In some scenarios, the stage 4 computing device may communicate these items to at least one other stage, and then the at least one other stage may communicate these items to stage 5. In some scenarios, the stage 4 computing device may communicate these items to a stage that is later in the process than stage 5. In some scenarios, where multiple computing devices (e.g., for multiple human translators of different languages) are used for stage 4, each stage 4 computing device may output its associated translation packages, for example, one per screen state, for the language(s) that the computing device can handle.

Stage 5 (indicated by reference number 110) may include updating the code base based on the revised translation packages. A stage computing device that implements stage 5 may receive (e.g., from a stage 3 computing device) stage 1 source code 152 and stage 2 properties files 154. Stage 1 source code 152 may be the same as or a copy of stage 1 source code 128, and stage 2 properties files 154 may be the same as or a copy of stage 2 properties files 130. The stage 5 computing device may receive (e.g., from at least one stage 4 computing device) revised translation packages 156. Revised translation packages 156 may include the same or a copy of revised translation packages 150, and perhaps revised translation packages from other stage 4 computing device (e.g., that handle other languages). A stage 5 computing device may include a listener module (not shown) that detects when revised translation packages are submitted (e.g., by an interface in stage 4, by a human translator). The routines of stage 5 may begin automatically when revised translation packages are received. A stage 5 computing device may include a properties file updater module 158 which may generate at least one stage 5 properties file 160. This module may include a series of instructions encoded on a machine-readable storage medium and executable by a processor of a stage computing device. In addition or as an alternative, this module may include one or more hardware devices including electronic circuitry for implementing the functionality described below.

Properties the updater module 158 may analyze the stage 2 properties files 154 and the revised translation packages 156, and may update the values in the stage 2 properties files with any corresponding values in the revised translation packages 156. As one example method of updating, properties file updater module 158 may read a first stage 2 properties file 154 (e.g., for a first language). For each property key and value in the file, properties file updater module 158 may search the revised translation package 156 (e.g., only searching in revised reduced stage 2 properties files of the same language) for the same property key. If the same property key exists, properties file updater module 158 may replace (e.g., in memory) the property key value in the stage 2 properties file with the value from the revised reduced stage 2 properties file. Once all the property keys in the first stage 2 properties files have been searched for (and perhaps values replaced), properties file updater module 158 may generate a stage 5 properties the 160 for that language, for example, by writing the stage 2 properties file with replaced values to a new file. Properties file updater module 158 may repeat the above process for the rest of the stage 2 properties files (for other supported language), generating corresponding stage 5 properties files 160 for the other supported languages.

At this point, stage 5 may include an updated code base for the software product. The code base may include stage 1 source code 152 and stage 5 properties files (e.g., one per supported language). At this point, in this stage or a different stage (e.g., indicated by reference number 162), the source code may be compiled based on the stage 5 properties file. The source code may be compiled for every supported language. Thus, for example, multiple instances of the software product may be generated, one for each supported language. Then, later, when a user is installing the software product, an installer may choose which instance of the application to install or provide based on various factors, for example, the user's country, region, locale or the like.

FIGS. 4A to 4C depict a flowchart of an example method 400 for automated contextual-based software localization. Method 400 may include multiple sub-methods, which, for simplicity, may simply be referred to as methods. For example, methods 430 and 460 may be part of method 400.

Methods 400, 430, 460 may be described below as being executed or performed by a system, which may refer to either a single computing device (e.g., a stage computing device) or multiple computing devices, where these one or more computing devices may execute or perform at least one stage (e.g., stages 102, 104, 106, 108, 110) of a software development process. Methods 400, 430, 460 may be implemented in the form of executable instructions stored on at least one machine-readable storage medium, such as storage medium 520, and/or in the form of electronic circuitry. In alternate embodiments of the present disclosure, one or more steps of methods 400, 430, 460 may be executed substantially concurrently or in a different order than shown in FIGS. 4A to 4C. In alternate embodiments of the present disclosure, methods 400, 430, 460 may include more or less steps than are shown in FIGS. 4A to 4C. In some embodiments, one or more of the steps of methods 400, 430, 460 may, at certain times, be ongoing and/or may repeat.

FIG. 4A is a high-level flowchart of an example method 400 for automated contextual-based software localization. Method 400 may start at step 402 and continue to step 404, where a system (e.g., as part of stage 102) may analyze (e.g., via module 114) stage 0 source code (e.g., 112) to identify language-specific elements and provide updated source code (e.g., stage 1 source code 116) and a stage 1 properties file (e.g., 118). At step 406, the system (e.g., as part of stage 104) may analyze (e.g., via module 124) the stage 1 properties file (e.g., 122) to provide initial translations for at least one target language and generate at least one stage 2 properties file (e.g., 126) for the target language(s). At step 408, the system (e.g., as part of stage 106) may execute or perform various routines as specified in more detail in method 430. At step 410, the system (e.g., as part of stage 108) may analyze (e.g., via human translator 148) translation packages (e.g., generated at step 408) to generate revised translation packages (e.g., 150) that may include more accurate translations. At step 412, the system (e.g., as part of stage 110) may execute or perform various routines as specified in more detail in method 460. Method 400 may eventually continue to step 450, where method 400 may stop.

FIG. 4B is a flowchart of an example method 430 for automated contextual-based software localization. Method 430 may be part of method 400, for example, substituted for step 408. Method 430 may be may be executed or performed as part of stage 106 in FIG. 1B, for example. Method 430 may start at step 432 and continue to step 434, where a system may detect (e.g., via module 134, 136 and/or 202) a screen state in stage 1 source code (e.g., 128). At this point, the steps included in box 436 (e.g., steps 438 and 440) may be executed once for each supported language. At step 438, the system may analyze (e.g., via module 136, 202 and/or 204) a stage 2 properties file (e.g., 130) for a particular language to determine portions that relate to the screen state. At step 440, the system may generate (e.g., via module 136 and/or 204) a reduced stage 2 properties file (e.g., 142) for the particular language, including only portions of the stage 2 properties file that relate to the screen state.

At step 442, the system may analyze (e.g., via module 136, 202 and/or 204) the stage 1 properties file (e.g., 132) to determine portions that relate to the screen state. At step 444, the system may generate (e.g., via module 136 and/or 204) a reduced stage 1 properties file (e.g., 144) that includes only portions of the stage 1 properties file that relate to screen state. At step 446, the system may capture (e.g., via module 134, 136, 202 and/or 206) a screen shot for the screen state. At step 448, the system may package (e.g., via module 136 and/or 208) the screen shot, the reduced stage 2 properties files and the reduced stage 1 properties file into one or more translation packages (e.g., 138), as described in more detail above. Method 430 may then return to step 434 and repeat the method for each screen state detected in the source code.

FIG. 4C is a flowchart of an example method 460 for automated contextual-based software localization. Method 460 may be part of method 400, for example, substituted for step 412. Method 460 may be may be executed or performed as part of stage 110 in FIG. 1B, for example. Method 460 may start at step 462 and continue to the steps in box 464. The steps included in box 464 (e.g., steps in box 466 and step 474) may be executed once for each supported language. The method may continue to the steps included in box 466, which may be executed once for each property key included in the stage 2 properties file (e.g., 154) for the particular language. At step 468, a system may find (e.g., module 158) the first or next property key in the stage 2 properties file. At step 470, the system may search the revised reduced stage 2 properties files (e.g., in at least one revised translation package 156) for the particular language (and for all screen states) to find the same property key. At step 472, the system may replace (e.g., via module 158) the property key value in the stage 2 properties file with the value from the revised reduced stage 2 properties file in which the same property key was found. At step 474, the system may generate a stage 5 properties file (for the particular language) using the update property key values determined in the steps of box 466. Method 460 may eventually continue to step 476, where method 460 may stop.

Figure 5:
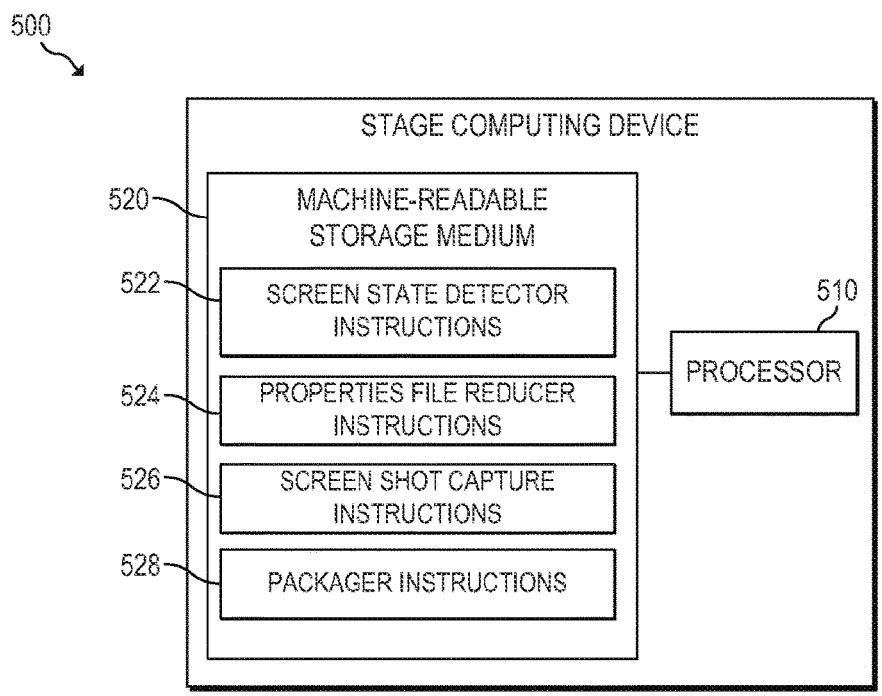
FIG. 5 is a block diagram of an example stage computing device for automated contextual-based software localization.

FIG. 5 is a block diagram of an example stage computing device 500 for automated contextual-based software localization. Stage computing device 500 may be any computing device capable of communicating (e.g., over a network) with at least one other computing device. More details regarding stages that may utilize at least one stage computing device similar to stage computing device 500 may be described above, for example, with respect to FIGS. 1A, 1B and 2. In the embodiment of FIG. 5, stage computing device 500 includes a processor 510 and a machine-readable storage medium 520.

Processor 510 may be one or more central processing units (CPUs), microprocessors, and/or other hardware devices suitable for retrieval and execution of instructions stored in machine-readable storage medium 520. In the particular embodiment shown in FIG. 5, processor 510 may fetch, decode, and execute instructions 522, 524, 526, 528 to perform automated contextual-based software localization. As an alternative or in addition to retrieving and executing instructions, processor 510 may include one or more electronic circuits comprising a number of electronic components for performing the functionality of one or more of instructions in machine-readable storage medium 520 (e.g., instructions 522, 524, 526, 528). With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within stage computing device 500, as shown in FIG. 5. In this situation, the executable instructions may be "installed" on the device 500. Alternatively, machine-readable storage medium 520 may be a portable (e.g., external) storage medium, for example, that allows stage computing device 500 to remotely execute the instructions or download the instructions from the storage medium. In this situation, the executable instructions may be part of an "installation package". As described herein, machine-readable storage medium 520 may be encoded with executable instructions for automated contextual-based software localization. Although the particular embodiment of FIG. 5 includes instructions that may be included in a particular sage (e.g., stage 106) of a software development process, computing device 500 may instead or in addition include instructions related to other stags of such a software development process.

Screen state detector instructions 522 may detect screen states in the source code (e.g., stage 1 source code 128) and may interface with a UI tester module (e.g., UI tester module 134). Screen state detector instructions 522 may be similar to screen stage detector module 202 of FIG. 2, for example, and more details may be provided above with respect to screen stage detector module 202 and/or translation package creator module 136 of FIG. 1B. Properties file reducer instructions 524 may generate at least one reduced properties file based on at least one properties file and information about the screen state(s). Properties file reducer instructions 524 may be similar to properties file reducer module 204 of FIG. 2, for example, and more details may be provided above with respect to properties file reducer module 204 and/or translation package creator module 136 of FIG. 1B.

Screen shot capture instructions 526 may capture, receive, generate and/or create at least one screen shot based on information about the screen state. Screen shot capture instructions 526 may be similar to Screen shot capture module 206 of FIG. 2, for example, and more details may be provided above with respect to screen shot capture instructions 206 and/or translation package creator module 136 of FIG. 1B. Packager instructions 528 may package, for each screen state, and perhaps up to one per supported language, the associated screen shot and at least one associated reduced properties file. Packager instructions 528 may be similar to packager module 208 of FIG. 2, for example, and more details may be provided above with respect to packager module 208 and/or translation package creator module 136 of FIG. 1B.

Figure 6:
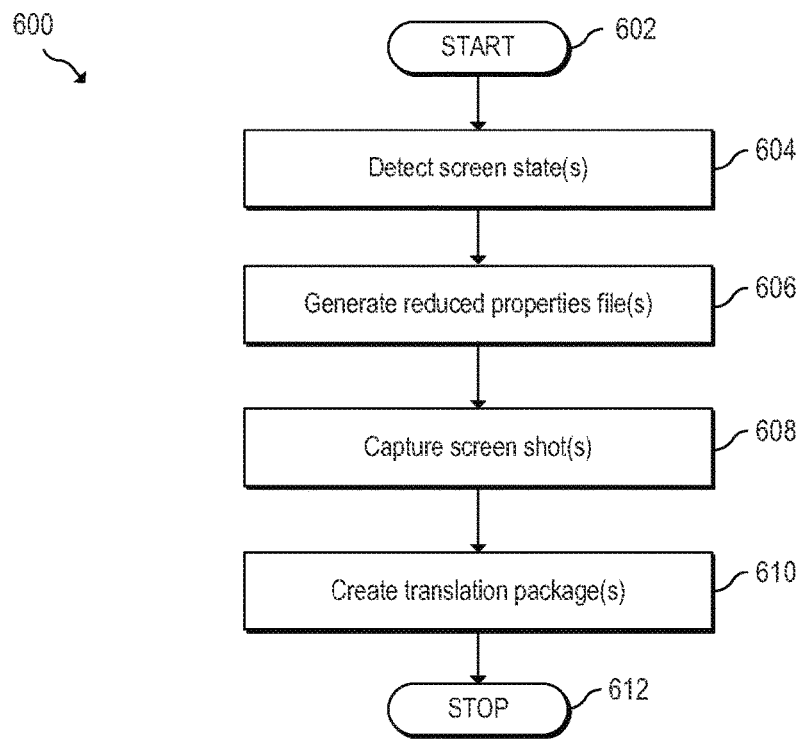
FIG. 6 is a flowchart of an example method for automated contextual-based software localization.

FIG. 6 is a flowchart of an example method 600 for automated contextual-based software localization. Methods 600 may be described below as being executed or performed by a system, which may refer to either a single computing device (e.g., a stage computing device) or multiple computing devices, where these one or more computing devices may execute or perform at least one stage (e.g., stages 102, 104, 106, 108, 110) of a software development process. Method 600 may be implemented in the form of executable instructions stored on a machine-readable storage medium, such as storage medium 520, and/or in the form of electronic circuitry. In alternate embodiments of the present disclosure, one or more steps of method 600 may be executed substantially concurrently or in a different order than shown in FIG. 6. In alternate embodiments of the present disclosure, method 600 may include more or less steps than are shown in FIG. 6. In some embodiments, one or more of the steps of method 600 may, at certain times, be ongoing and/or may repeat.

Method 600 may start at step 602 and continue to step 604, where a system may detect (e.g., via instructions 522) at least one screen state in source code (e.g., stage 1 source code 128), for example, by using a UI tester module (e.g., UI tester module 134). At step 606, the system may generate (e.g., via instructions 524) a reduced properties file based on at least one properties file and information about the screen state(s). At step 608, the system may capture, receive, generate and/or create (e.g., via instructions 526) at least one screen shot based on information about the screen state. At step 610, the system may package (e.g., via instructions 528), for each screen state, and perhaps up to one per supported language, the associated screen shot and at least one associated reduced properties file. Method 600 may eventually continue to step 612, where method 600 may stop.

The invention claimed is:

1. A system for automated contextual-based software localization, the system comprising:
   a processor; and
   a memory storing instructions that when executed by the processor cause the processor to:
   detect multiple portions of source code related to a software product that cause multiple screen states to be generated, respectively, wherein each of multiple language-specific elements in the source code has been replaced with one property key of multiple property keys that function as placeholders for the language-specific elements in the source code;
   for each particular screen state of the multiple screen states:
      determine, for the particular screen state, a subset of the multiple property keys associated with the particular screen state, wherein a number of property keys in the subset is less than a total number of the multiple property keys;
      generate, for the particular screen state, a properties data file that includes the subset of property keys and associated property key values related to a first language;
      generate, for the particular screen state, a screen shot that is uniquely related to the particular screen state corresponding to a portion of the source code that causes the particular screen state to be generated; and
      create, for the particular screen state, a translation package that includes the screen shot and the properties data file associated with the particular screen state;
   send the translation package of each of the multiple screen states to a translation computing device that revises the property key values in the properties data file of the translation package and creates a revised properties data file for each of the multiple screen states;
   receive, from the translation computing device, the revised properties data file for each of the multiple screen states, which form a group of revised properties data files related to the multiple screen states; and
   create a single properties data file for the first language based on the group of revised properties data files, wherein the single properties data file and the source code are compiled to create an executable version of the software product.

2. The system of claim 1, wherein the translation computing device receives input from a human translator to review the property key values.

3. The system of claim 1, wherein, for each particular screen state of the multiple screen states, the processor is further to:
   generate, for the particular screen state, a second properties data file that includes another subset of the multiple property keys that is uniquely related to the particular screen state, wherein the second properties data file further includes, for each included property key, a property key value related to a second language; and
   create, for the particular screen state, a second translation package that includes the screen shot and the second properties data file associated with the particular screen state.

4. The system of claim 1, wherein, for each particular screen state of the multiple screen states, the processor is further to:
   generate, for the particular screen state, a second properties data file that includes another subset of the multiple property keys that is uniquely related to the particular screen state, wherein the second properties data file further includes, for each included property key, a property key value related to a second language,
   wherein the translation package, for the particular screen state, includes the second properties data file associated with the particular screen state.

5. The system of claim 1, wherein the processor is further to:
   run a user interface tester module that analyzes user interface components in the source code, wherein the user interface tester module is to analyze the source code to detect the multiple screen states and generate, for each of the multiple screen states, the properties data file.

6. The system of claim 1, wherein the instructions are to cause the processor to:
   in response to receipt of the source code, identify the language-specific elements in the source code; and
   replace the language-specific elements in the source code with the multiple property keys.

7. A method for automated contextual-based software localization, the method comprising:
   receiving, in association with a software product, source code and a first-language properties data file, wherein language-specific elements in the source code have been replaced with unique property keys, the unique property keys function as placeholders for the language-specific elements in the source code, and wherein the first-language properties data file includes the unique property keys and first-language property key values corresponding to the unique property keys, the first-language property key values being equal to first-language translations of the language-specific elements;
   detecting, by a processor, a first portion of the source code that causes a first screen state to be generated;
   determine, for the first screen state, a subset of property keys associated with the first screen state, wherein a number of property keys in the subset is less than a total number of the unique property keys;
   generating, by the processor, a first first-language properties data file that includes the subset of property keys in the first-language properties data file and relates to the first screen state;

generating, by the processor, a first screen shot for the first screen state corresponding to the first portion of the source code that causes the first screen state to be generated;

packaging, into a first translation package, the first screen shot and the first first-language properties data file;

sending, by the processor, the first translation package to a translation service that reviews and modifies the first first-language properties data file in the first translation package to create a first revised properties data file;

receiving, from the translation service, the first revised properties data file related to the first screen state;

receiving, from the translation service, a second revised properties data file related to a second screen state; and creating, by the processor, a single revised first-language properties data file based on the first revised properties data file and the second revised properties data file, wherein the single revised first-language properties data file and the source code are compiled to create an executable version of the software product.

8. The method of claim 7, further comprising:

receiving, in association with the software product, an original-language properties data file that includes the multiple unique property keys and associated original property key values, each original property key value being equal to one of the language-specific elements that the associated unique property key replaced;

generating a first original-language properties data file that includes a subset of information in the original-language properties data file, wherein the subset uniquely relates to the first screen state, wherein the packaging of the first translation package includes packaging the first reduced original-language properties data file into the first translation package.

9. The method of claim 7, wherein the translation service is to receive input from a human translator to modify the first first-language properties data file in the first translation package.

10. The method of claim 7, further comprising:

in response to receipt of the source code, identifying the language-specific elements in the source code; and replacing the language-specific elements identified in the source code with the property keys.

11. A non-transitory machine-readable storage medium storing instructions that when executed by a processor cause the processor to:

detect a first portion of source code for a software product that causes a particular screen state to be generated;

determine a subset of property keys associated to the particular screen state, wherein a number of property keys in the subset is less than a total number of property keys;

generate a properties data file including the subset of property keys for a first language, wherein the properties data file relates to the particular screen state;

create a screen shot related to the particular screen state;

create a translation package that includes the screen shot and the properties data file;

create multiple translation packages based on the translation package for each particular screen state of multiple screen states;

send the multiple translation packages to a translation computing device that revises property key values in properties data files included in the multiple translation packages and creates revised properties data files;

receive, from the translation computing device, the revised properties data files related to the multiple screen states; and create a single properties data file for the first language based on the revised properties data files, wherein the single properties data file and the source code are compiled to create an executable version of the software product.

12. The non-transitory machine-readable storage medium of claim 11, wherein the source code includes multiple language-specific elements that are localized to compile the source code for the first language, and wherein each of the multiple language-specific elements is uniquely associated with one of the multiple screen states.

13. The non-transitory machine-readable storage medium of claim 11, wherein each of the multiple properties data files associated with a particular screen state includes localized or translated versions of the language-specific elements that are uniquely associated with the particular screen state.

14. The non-transitory machine-readable storage medium of claim 11, wherein the translation computing device is to receive input from a human translator to review the multiple properties data files.

15. The non-transitory machine-readable storage medium of claim 11, wherein the instructions are to cause the processor to:

identify language-specific elements in the source code; and replace the language-specific elements identified in the source code with the property keys that function as placeholders for the language-specific elements in the source code.

* * * * *